(12) United States Patent
Peuchert et al.

(10) Patent No.: US 10,418,658 B2
(45) Date of Patent: *Sep. 17, 2019

(54) ELECTRICAL STORAGE SYSTEM COMPRISING A DISC-SHAPED DISCRETE ELEMENT, DISCRETE ELEMENT, METHOD FOR THE PRODUCTION THEREOF, AND USE THEREOF

(71) Applicant: SCHOTT AG, Mainz (DE)

(72) Inventors: Ulrich Peuchert, Bodenheim (DE); Rainer Liebald, Nauheim (DE); Miriam Kunze, Neustadt am Ruebenberge (DE); Thorsten Damm, Nieder-Olm (DE); Clemens Ottermann, Hattersheim (DE); Nikolaus Schultz, Essenheim (DE)

(73) Assignee: SCHOTT AG, Mainz (DE)

( * ) Notice: Subject to any disclaimer, the term of this patent is extended or adjusted under 35 U.S.C. 154(b) by 47 days.

This patent is subject to a terminal disclaimer.

(21) Appl. No.: 15/610,707

(22) Filed: Jun. 1, 2017

(65) Prior Publication Data
US 2017/0263973 A1    Sep. 14, 2017

Related U.S. Application Data

(63) Continuation of application No. PCT/EP2015/077799, filed on Nov. 26, 2015.

(30) Foreign Application Priority Data

Dec. 1, 2014    (DE) .................. 10 2014 117 640

(51) Int. Cl.
*H01M 10/04* (2006.01)
*C03C 3/093* (2006.01)
(Continued)

(52) U.S. Cl.
CPC ......... *H01M 10/0436* (2013.01); *C03C 3/064* (2013.01); *C03C 3/066* (2013.01);
(Continued)

(58) Field of Classification Search
CPC ........... H01M 10/0436; H01M 2/0267; H01M 10/0525; H01M 10/0585; C03C 3/087; C03C 3/091; C03C 3/093; C03C 3/097
(Continued)

(56) References Cited

U.S. PATENT DOCUMENTS 6,906,436 B2   6/2005   Jenson
7,211,351 B2   5/2007   Klaassen
(Continued)

FOREIGN PATENT DOCUMENTS

CN   102844908   12/2012
CN   106663748   5/2017
(Continued)

OTHER PUBLICATIONS

Machine translation of JP 11-060277 (no date).*
(Continued)

*Primary Examiner* — Amanda C. Walke
(74) *Attorney, Agent, or Firm* — Ohlandt, Greeley, Ruggiero & Perle, L.L.P.

(57) ABSTRACT

An electrical storage system is provided that has a thickness of less than 2 mm, which includes at least one sheet-type discrete element. The sheet-type discrete element exhibits high resistance against an attack of transition metals or transition metal ions, in particular titanium, wherein the sheet-type discrete element contains titanium. The invention also relates to a sheet-type discrete element for use in an electrical storage system, which exhibits high resistance to the attack of transition metals or of transition metal ions, in particular titanium.

24 Claims, 2 Drawing Sheets

(51) Int. Cl.
| | |
|---|---|
| *H01M 2/02* | (2006.01) |
| *H01M 10/0525* | (2010.01) |
| *H01M 10/0585* | (2010.01) |
| *C03C 3/085* | (2006.01) |
| *C03C 3/091* | (2006.01) |
| *C03C 4/20* | (2006.01) |
| *C03C 3/064* | (2006.01) |
| *C03C 3/066* | (2006.01) |
| *C03C 3/087* | (2006.01) |
| *C03C 3/095* | (2006.01) |
| *C03C 3/097* | (2006.01) |

(52) U.S. Cl.
CPC .............. *C03C 3/085* (2013.01); *C03C 3/087* (2013.01); *C03C 3/091* (2013.01); *C03C 3/093* (2013.01); *C03C 3/095* (2013.01); *C03C 3/097* (2013.01); *C03C 4/20* (2013.01); *H01M 2/0267* (2013.01); *H01M 10/0525* (2013.01); *H01M 10/0585* (2013.01)

(58) Field of Classification Search
USPC ........................................................ 429/162
See application file for complete search history.

(56) References Cited

U.S. PATENT DOCUMENTS

| | | | |
|---|---|---|---|
| 7,494,742 B2 | 2/2009 | Tarnowski | |
| 8,228,023 B2 | 7/2012 | Sather | |
| 2001/0032666 A1 | 10/2001 | Jenson | |
| 2008/0001577 A1 | 1/2008 | Sather | |
| 2008/0003496 A1* | 1/2008 | Neudecker | H01M 2/1094 429/122 |
| 2008/0032236 A1 | 2/2008 | Wallace | |
| 2008/0261107 A1* | 10/2008 | Snyder | H01M 2/0207 429/144 |
| 2009/0311591 A1* | 12/2009 | Snyder | H01M 2/10 429/156 |
| 2010/0104942 A1 | 4/2010 | Lange | |
| 2011/0281167 A1 | 11/2011 | Sabi | |
| 2012/0040211 A1* | 2/2012 | Murata | C03B 17/064 429/9 |
| 2013/0136981 A1 | 5/2013 | Peuchert | |
| 2013/0244102 A1* | 9/2013 | Golodnitsky | H01M 2/0202 429/210 |
| 2014/0030449 A1 | 1/2014 | Song | |
| 2015/0079389 A1 | 3/2015 | Krawinkel | |
| 2015/0280284 A1* | 10/2015 | Shakespeare | H01M 10/0585 429/162 |
| 2017/0104188 A1 | 4/2017 | Kunze | |
| 2017/0104190 A1 | 4/2017 | Peuchert | |
| 2017/0104192 A1* | 4/2017 | Damm | C03C 3/078 |
| 2017/0149093 A1* | 5/2017 | Sun | H01M 10/0585 |
| 2017/0271716 A1 | 9/2017 | Peuchert | |

FOREIGN PATENT DOCUMENTS

| | | | |
|---|---|---|---|
| CN | 106663750 | 5/2017 | |
| CN | 107000117 | 8/2017 | |
| DE | 102012207424 | 6/2013 | |
| DE | 102012206273 | 10/2013 | |
| DE | 102014117632 | 12/2015 | |
| DE | 102015109992 | 12/2015 | |
| EP | 2434567 | 3/2012 | |
| JP | 11060277 A * | 3/1999 | ........... C03C 17/007 |
| JP | H1160277 | 3/1999 | |
| JP | 2008226728 | 9/2008 | |
| JP | 2013023420 | 2/2013 | |
| JP | 2013023420 A * | 2/2013 | ........... G11B 5/7315 |
| WO | 2014062676 | 4/2014 | |
| WO | 2015197597 | 12/2015 | |

OTHER PUBLICATIONS

Machine translation of JP 2013-023420 (no date).*
English translation of International Search Report dated Jun. 29, 2016 for corresponding PCT/EP2015/077799, 3 pages.
English translation of Written Opinion dated Jun. 29, 2016 for corresponding PCT/EP2015/077799, 6 pages.
English translation of International Preliminary Report on Patentability dated Jun. 6, 2017 for corresponding PCT/EP2015/077799, 9 pages.

* cited by examiner

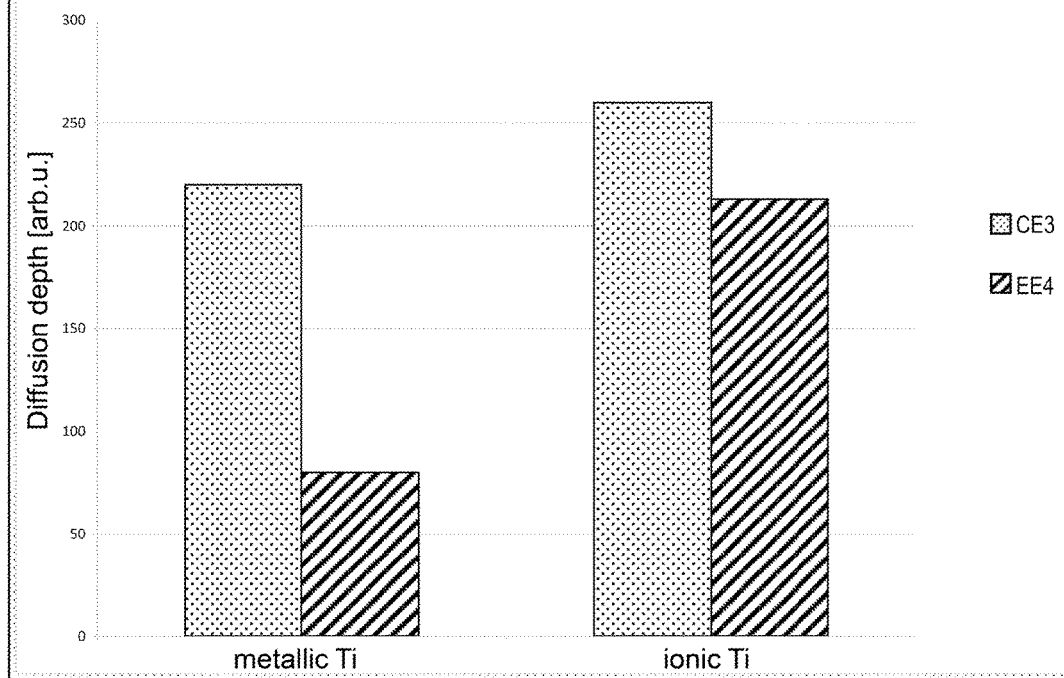
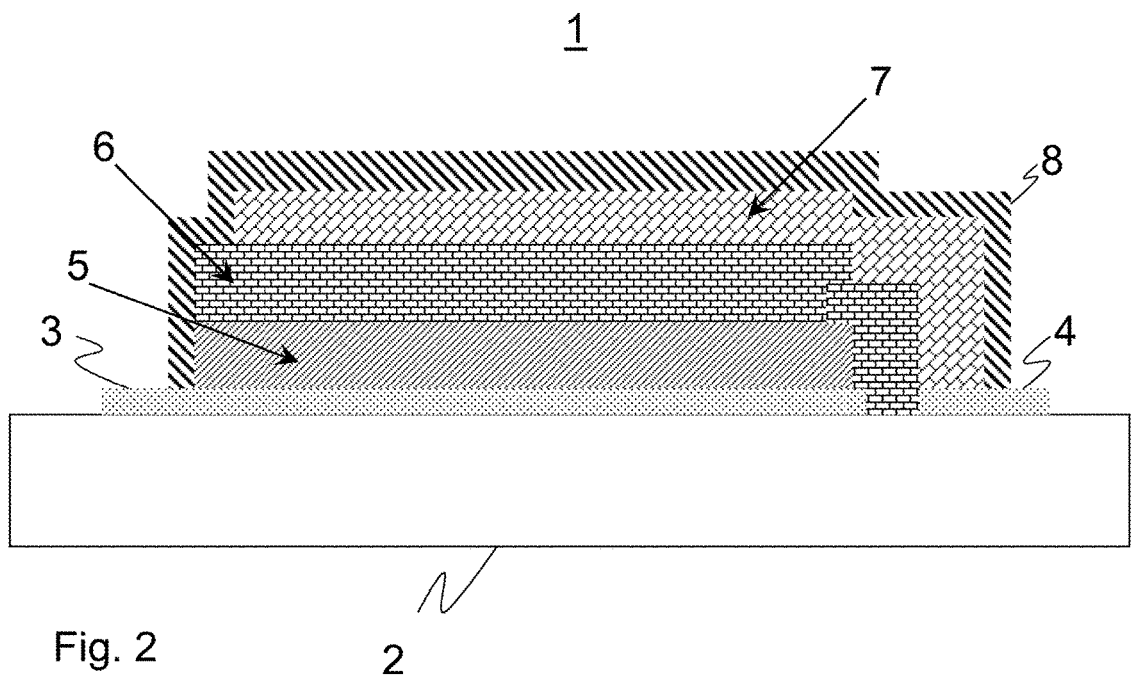

ELECTRICAL STORAGE SYSTEM COMPRISING A DISC-SHAPED DISCRETE ELEMENT, DISCRETE ELEMENT, METHOD FOR THE PRODUCTION THEREOF, AND USE THEREOF

CROSS REFERENCE TO RELATED APPLICATIONS

This application is a continuation of International Application No. PCT/EP2015/077799 filed on Nov. 26, 2015, which claims the benefit under 35 U.S.C. 119 of German Application No. 102014117640.5 filed on Dec. 1, 2014, the entire contents of both of which are incorporated by reference herein.

BACKGROUND

1. Field of the Invention

The present disclosure relates to electrical storage system comprising a sheet-type discrete element, discrete element, method for the production thereof, and use thereof.

2. Related Art

Electrical storage systems have long been state of the art and include in particular batteries, but also so-called supercapacitors, short supercaps. In particular so-called lithium-ion batteries are being discussed in the field of novel applications such as electromobility because of the high energy densities that can be realized with them, but they have already been used for a number of years in portable devices such as smartphones or laptop computers. These conventional rechargeable lithium-ion batteries are in particular distinguished by the use of organic solvent-based liquid electrolytes. However, the latter are inflammable and lead to safety concerns regarding the use of the cited lithium-ion batteries. One way of avoiding organic electrolytes is to use solid electrolytes. However, such a solid electrolyte has a conductivity that is usually clearly smaller, i.e. by several orders of magnitude, than that of a corresponding liquid electrolyte. In order to obtain acceptable conductivities and to be able to exploit the advantages of a rechargeable lithium-ion battery, such solid-state batteries are nowadays especially produced in the form of so-called thin film batteries (TFB) or thin film storage elements which find their use in particular in mobile applications, for example in smart cards, in medical technology and sensor technology as well as in smartphones and other applications which require smart, miniaturized and possibly even flexible power sources.

An exemplary lithium-based thin film storage element has been described in US 2008/0001577 and basically consists of a substrate on which the electronically conductive collectors for the two electrodes are deposited in a first coating step. In the further manufacturing process, the cathode material is first deposited on the cathode collector, usually lithium cobalt oxide, LCO. In the next step, a solid electrolyte is deposited, which is usually an amorphous material including the substances lithium, oxygen, nitrogen, and phosphorus, and which is referred to as LiPON. In the next step, an anode material is deposited so as to be in contact with the substrate, the anode collector, and the solid electrolyte. In particular, metallic lithium is used as the anode material. When the two collectors are connected in electrically conductive manner, lithium ions will migrate through the solid-state ion conductor from the anode to the cathode in the charged state, resulting in a current flow from the cathode to the anode through the electrically conductive connection of the two collectors. Vice versa, in the non-charged state migration of the ions from the cathode to the anode can be enforced by applying an external voltage, whereby the battery is charged.

A further thin film storage element is described in US 2001/0032666 A1, by way of example, and also comprises a substrate onto which different functional layers are deposited.

The layers deposited for such a thin film storage element usually have a thickness of about 20 µm or less, typically less than 10 µm or even less than 5 µm; a total thickness of the layer structure can be assumed to be 100 µm or less.

In the context of the present application, thin film storage elements refer to rechargeable lithium-based thin film storage elements and supercaps, by way of example; however the invention is not limited to these systems but may as well be used in other thin film storage elements, e.g. rechargeable and/or printed thin film cells.

A thin film storage element is generally manufactured using complex coating processes also including patterned deposition of the individual materials. Very complex patterning of the exact thin film storage elements is possible, as can be seen from U.S. Pat. No. 7,494,742 B2, for example. In case of lithium-based thin film storage elements, particular difficulties are moreover encountered due to the use of metallic lithium as an anode material because of the high reactivity thereof. For example, metallic lithium has to be handled under preferably water-free conditions since otherwise it would react to form lithium hydroxide and the functionality as an anode would no longer be ensured. Accordingly, a lithium-based thin film storage element must also be protected against moisture by an encapsulation.

U.S. Pat. No. 7,494,742 B2 describes such an encapsulation for the protection of non-stable constituents of a thin film storage element, such as, e.g., lithium or certain lithium compounds. The encapsulation function is here provided by a coating or a system of different coatings which may fulfill further functions as part of the overall design of the battery.

In addition, as described in document US 2010/0104942 A1 by way of example, under the manufacturing conditions of a lithium-based thin film storage element, in particular during so-called annealing or heat treatment steps which are necessary for the formation of crystal structures suitable for lithium intercalation, undesirable side reactions of the mobile lithium ions with the substrate will occur, since the lithium has a high mobility and can easily diffuse into common substrate materials.

A further issue with thin film storage elements relates to the substrate materials employed. The prior art describes a multiplicity of different substrate materials, such as, for example, silicon, mica, various metals, and ceramic materials. The use of glass is also often mentioned, but essentially without further details on the particular composition or precise properties thereof.

US 2001/0032666 A1 describes a capacitor-type energy storage which may for instance be a lithium-ion battery. Here, semiconductors are mentioned as substrate materials, inter alia.

U.S. Pat. No. 6,906,436 B2 describes a solid state battery in which metal foils, semiconductor materials or plastic films can be used as substrate materials, for example.

U.S. Pat. No. 6,906,436 B2 describes a variety of possibilities for optional substrate materials, for example metals or metal coatings, semiconducting materials or insulators such as sapphire, ceramics, or plastics. Different geometries of the substrate are possible.

In U.S. Pat. No. 7,494,742 B2, metals, semiconductors, silicates, and glass, as well as inorganic or organic polymers are described as substrate materials, inter alia.

U.S. Pat. No. 7,211,351 B2 mentions metals, semiconductors, or insulating materials and combinations thereof as substrates.

US 2008/0001577 A1 mentions semiconductors, metals, or plastic films as substrates.

EP 2434567 A2 mentions, as substrates, electrically conductive materials such as metals, insulating materials such as ceramics or plastics, and semiconducting materials such as, e.g., silicon, and combinations of semiconductors and conductors or more complex structures for adapting the coefficient of thermal expansion. These or similar materials are also mentioned in documents US 2008/0032236 A1, U.S. Pat. No. 8,228,023 B2, and US 2010/0104942 A1.

By contrast, US 2010/0104942 A1 describes, as substrate materials that are relevant in practice, only substrates made of metals or metal alloys having a high melting point, and dielectric materials such as high quartz, silicon wafers, aluminum oxide, and the like. This is due to the fact that for producing a cathode from the usually employed lithium cobalt oxide (LCO), a temperature treatment at temperatures of 500° C. and more is necessary in order to obtain a crystal structure that is particularly favorable for storing Li+ ions in this material, so that materials such as polymers or inorganic materials with low softening points cannot be used. However, metals or metal alloys as well as dielectric materials have several shortcomings. For example, dielectric materials are usually brittle and cannot be used in cost-efficient roll-to-roll processes, while metals or metal alloys, on the other hand, tend to oxidize during a high-temperature treatment of the cathode material. In order to circumvent these difficulties, US 2010/0104942 A1 proposes a substrate made of different metals or silicon, wherein the redox potentials of the combined materials are adapted to each other so that controlled oxide formation occurs.

Also widely discussed is how to circumvent the high temperature resistance of the substrate as required, for example, in the aforementioned US 2010/0104942 A1. By adapting process conditions, for example, substrates with a temperature resistance of 450° C. or below can be used. However, prerequisites for this are deposition methods in which the substrate is heated and/or the sputtering gas mixture of $O_2$ and Ar is optimized and/or a bias voltage is applied and/or a second sputtering plasma is applied in the vicinity of the substrate. This is discussed, for example, in US 2014/0030449 A1, in Tintignac et al., Journal of Power Sources 245 (2014), 76-82, or else in Ensling, D., Photoelectron spectroscopy examination of the electronic structure of thin lithium cobalt oxide layers, dissertation, Technical University of Darmstadt, 2006. In general, however, such process engineering adaptations are expensive and, depending on the processing, are hardly implementable in a cost-effective manner, especially if in-line coating of wafers is envisaged.

US 2012/0040211 A1 describes, as a substrate, a glass film having a thickness of at most 300 μm and a surface roughness of not more than 100 Å. This low surface roughness is required because the layers of a thin film storage element generally have very low layer thicknesses. Even small unevenness of the surface may have a critical adverse effect on the functional layers of the thin film storage element and may thus result in failure of the battery as a whole.

The same applies to document WO 2014/062676 which claims thin film batteries using borosilicate glass or soda-lime glass. Again, information on thickness variations of the substrate are not given there.

In summary, problems of conventional thin film storage elements are related to the corrosion susceptibility of the employed materials, in particular if metallic lithium is used, which implies complex layer structures and hence causes high costs, and are also related to the type of the substrate which should in particular be non-conductive but flexible, should exhibit high temperature resistance and should preferably be inert to the functional layers of the storage element used, and moreover should allow for deposition of layers preferably free of defects and with good layer adhesion on the substrate. However, it has been found that even with substrates that have a particularly low surface roughness such as the glass film proposed in US 2012/0040211 A1, for example, failure of layers occurs as a result of cracks and/or detachment of the layers, as described in US 2014/0030449 A1 for example. The method for avoiding high annealing temperatures proposed therein, namely by applying a bias voltage when creating the lithium cobalt oxide layer, however, is difficult to implement in the common in-line processes for producing thin film storage elements, as already described above, so that from a process engineering point of view it is more favorable to use a substrate that has an appropriately high temperature resistance.

Another problem that is inherent to all substrate materials regardless of their exact composition relates to one of the possible handling solutions of ultra-thin glass. The so-called carrier solution consists of temporarily fixing ultra-thin glass on a support prior to or during the coating process or the transfer process steps. This may optionally be achieved using electrostatic forces, or by using an organic, detachable adhesive compound. In particular in the latter case it has to be ensured, by suitable choice of the substrate or of the carrier which are usually made from the same material, that debonding, that means detachment of the substrate from the carrier is possible. The debonding often provokes the occurrence of torsional stresses in the substrate, which stresses may furthermore be transferred to the layers deposited on the substrate, which also leads to cracks and detachment of the layers, so that as a result the layer defects caused by thickness variations of the substrate may further aggravate.

SUMMARY

Some processing steps in the fabrication of thin film electrical storage elements may, in principle, be performed by using high-energy optical energy sources such as, for example, excimer lasers. In order to allow for all processing options, for example cutting of wafers by means of lasers or curing organic adhesive materials by UV sources, a selectively modifiable UV transmittance of a substrate material is advantageous.

An object of the invention is to provide an electrical storage system which comprises a sheet-type discrete element, the sheet-type discrete element, and the production and use thereof.

A further object of the present invention is to provide an electrical storage element, in particular a thin film storage element, which mitigates the shortcomings of current prior art and allows for a cost-effective fabrication of thin film storage elements. A further object of the invention is to provide a sheet-type element for use in an electrical storage element, and a way for producing same and use thereof.

The sheet-type discrete element should mitigate the deficiencies of prior art and should exhibit sufficient thermal stability of >400° C., together with sufficient resistance against contamination by battery components, furthermore a high barrier effect against moisture, and should have an optical transmittance or blocking behavior to UV radiation adapted to the fabrication processes and requirements of the specific cell design. Moreover, the substrate has to contribute to good adhesion of applied layers, i.e. in particular must have an appropriate expansion coefficient in view of the deposition of the nearest layer, usually the LCO.

The object of the invention can surprisingly easily be achieved already by incorporating, into a thin film storage element, a sheet-type discrete element which exhibits a total thickness variation (ttv) in a range <25 µm, preferably <15 µm, more preferably <10 µm, and most preferably <5 µm, based on the wafer or substrate size employed. Thus, this specification typically refers to wafer or substrate sizes in a range >100 mm in diameter or a size of 100 mm×100 mm, preferably >200 mm in diameter or a size of 200 mm×200 mm, and more preferably >400 mm in diameter or a size of 400 mm×400 mm.

In the context of the present application, a shaped body is considered to be of sheet type if the dimension of the element in one spatial direction is smaller by at least half an order of magnitude than in the two other spatial directions. In the context of the present application a shaped body is considered as being discrete if it is separable as such from the electrical storage system under consideration, that is to say it may in particular as well be provided alone.

The high uniformity of the thickness distribution of the sheet-type discrete element is essential for keeping a consistent quality from cell to cell. Thin film batteries are mostly manufactured at wafer level, with or without masking, and are then cut out. In the case of insufficient thickness consistency, the cells on a wafer or at least from wafer to wafer might have different thicknesses and hence different specifications, e.g. with respect to weight/energy density. This is disadvantageous in particular when the application requires an extremely homogeneous consistency of the product specifications of the electrical storage element. With a low total thickness variation, costs can be saved in quality inspection and production rejects can be avoided.

If the sheet-type discrete element is used as a substrate for the deposition of a thin film storage element, a further result of the high uniformity of the thickness distribution is that the layers are deposited evenly and without lateral variation of the layer thickness distribution. This in turn leads to the situation that in case of subsequent process steps, for example annealing of the LCO layer after deposition thereof, local stresses in the individual layers or between the individual layers at the respective interfaces are prevented, in particular also at the interfaces between layer and substrate. In this way, cracks and detachments are efficiently avoided.

It has been found, namely, that the failure of layers, in particular in the form of cracks occurring in the layer or delamination of the layers from the substrate, is not so much caused by the presence of surface unevenness of the substrate but rather by a combination of thickness variations of the substrate and forces which are transferred to the substrate during the detachment of the substrate from the so-called carrier.

Furthermore, it has been found advantageous if the sheet-type discrete element is selectively adjustable with respect to its properties in the UV range, i.e. absorptance or transmittance, as a function of specifically selected compositions.

Such selectively adjusted transmittance makes it possible to perform a variety of process steps simply by a treatment with electromagnetic radiation, for example promoting the debonding of the substrate from the carrier, since in this way the organic adhesive layers can be disintegrated particularly effectively; curing of encapsulation layers for protecting the storage element against an attack of corrosive media, for example oxygen and/or water vapor, such as described in DE 10 2012 206 273 A1, for example; and annealing of the lithium-cobalt oxide layer by high-energy radiation in order to provide, preferably quantitatively, the desired crystallographic high-temperature phase with its high specific storage density.

The sheet-type discrete element of the invention has a thickness of not more than 2 mm, preferably less than 1 mm, more preferably less than 500 µm, and yet more preferably of less than or equal to 200 µm. Most preferred is a thickness of the substrate of not more than 100 µm.

For example it is possible to directly produce sheet-type discrete elements in the desired thickness. However, it is also possible to obtain the desired thickness by thinning thicker sheet-type discrete elements in a process step following the fabrication or further processing, for example by one or more of the processes grinding, etching, and polishing.

In one embodiment of the invention, the sheet-type discrete element exhibits a water vapor transmission rate (WVTR) of $<10^{-3}$ g/(m²·d), preferably of $<10^{-5}$ g/(m²·d), and most preferably of $<10^{-6}$ g/(m²·d).

In a further embodiment, the sheet-type discrete element has a specific electrical resistance at a temperature of 350° C. and at an alternating current with a frequency of 50 Hz that is greater than $1.0*10^{6}$ Ohm·cm.

The sheet-type discrete element is furthermore characterized by a maximum temperature resistance of at least 400° C., preferably at least 500° C., and by a coefficient of linear thermal expansion α in a range from $2.0*10^{-6}$/K to $10*10^{-6}$/K, preferably from $2.5*10^{-6}$/K to $8.5*10^{-6}$/K, and most preferably from $3.0*10^{-6}$/K to $8.0*10^{-6}$/K. It has been found that particularly good layer qualities can be achieved in a thin film storage element when the following relationship applies to the maximum load temperature $\theta_{Max}$, in ° C., and the coefficient of linear thermal expansion α: $600 \cdot 10^{-6} \leq \theta_{Max} \cdot \alpha \leq 8000 \cdot 10^{-6}$, particularly preferably $800 \cdot 10^{-6} \leq \theta_{Max} \cdot \alpha \leq 5000 \cdot 10^{-6}$.

Here, unless otherwise stated, the linear coefficient of thermal expansion α is given for a range from 20 to 300° C. The notations α and $\alpha_{(20-300)}$ are used synonymously in the context of the present application. The given value is the nominal coefficient of mean linear thermal expansion according to ISO 7991, which is determined in static measurement.

In the context of the present application, the maximum load temperature $\theta_{Max}$ is considered as a temperature at which the functional integrity of the material is still fully ensured and at which decomposition and/or degradation reactions of the material have not yet started. Naturally this temperature is defined differently depending on the material used. For oxidic crystalline materials, the maximum load temperature is usually given by the melting point; for glasses usually the glass transition temperature $T_g$ is assumed, wherein for organic glasses the decomposition temperature may even be below $T_g$; and for metals or metal alloys the maximum load temperature can be approximately indicated by the melting point, unless the metal or the metal alloy reacts in a degradation reaction below the melting point.

The transformation temperature $T_g$ is defined by the point of intersection of the tangents to the two branches of the expansion curve during a measurement with a heating rate of 5 K/min. This corresponds to a measurement according to ISO 7884-8 or DIN 52324, respectively.

In a further embodiment, the sheet-type discrete element has, on at least one face thereof, a surface which is designed so as to be inert and/or permeable to a reduced degree and/or impermeable to materials that are applied to this surface.

In a further embodiment, this at least one surface is designed as a barrier against a diffusion of metals.

In a further embodiment, this at least one surface is designed as a barrier to a transition metal or to ions of a transition metal.

This metal is preferably titanium.

In a further embodiment, this barrier provided on at least one surface of the sheet-type element is formed by doping or overdoping with an alkali metal and/or an alkaline earth metal, such as, lithium, or a transition metal. It has been found that already low contents of lithium, but also of a transition metal, can prevent or reduce a diffusion of harmful transition metals from the layer materials of the electrical storage element, such as for example from lithium titanate, metallic titanium or titanium alloys, into the sheet-type discrete element.

A diffusion of transition metal ions, for example titanium ions, into the sheet-type discrete element and thus a modification and/or destabilization of the internal structure thereof may occur in various ways.

The stability of the sheet-type discrete elements against transition metals, for example titanium, can be examined in various ways.

Contact of sheet-type discrete elements with metallic components.

One possibility is to examine the stability of sheet-type discrete elements against metallic titanium. Metallic titanium may be employed in a thin film storage element as an adhesive and/or contact layer, for example. During the generation of such a transition metal layer, reactions between the metal and the substrate, that is the sheet-type discrete element, may possibly occur. During the operation of the thin film storage element it is furthermore possible during the charging and discharging cycles, that contact reactions occur between the substrate and the transition metal layer.

In order to test the stability of the sheet-type discrete elements against a transition metal, metallic layers may be applied and may subsequently be subjected to further process steps for examining the contact stability.

In order to examine the sheet-type discrete element for contact stability with respect to metallic titanium, metallic titanium layers are applied by a sputter deposition technique. In this process, precious gas atoms, usually argon, are ionized and accelerated towards a metallic titanium target by applying a negative voltage. As a result, titanium atoms are released from the target and deposited on the nearby substrate as a thin film. A layer of approximately 100 nm thickness is applied in order to examine contact stability.

Contact of sheet-type discrete elements with metal ions.

In order to determine the diffusion of ions of a transition metal, for example titanium, into the sheet-type discrete element, it is suitable to apply a sol of a transition metal.

If the diffusion of titanium ions is to be examined, a titanium-containing sol can be applied to the sheet-type discrete element, in which the titanium has an oxidation stage greater than zero. In order to simulate the exposure of the sheet-type discrete elements to titanium ions over several years, the substrates coated with the titanium-containing sol were subsequently heated to 550° C.

Such a titanium-containing sol is obtained, for example, by complexing 342.2 g (corresponding to 1.5 mol) of titanium (VI) ethoxide (Ti(OEt)$_4$) with 150.18 g (corresponding to 1.5 mol) of acetylacetone which is added dropwise to the titanium (VI) ethoxide (Ti(OEt)$_4$) using a dropping funnel, over 20 minutes. The solution so obtained is then stirred for another hour. The resulting ethanol and the excess water of the reaction solution are then removed by rotary evaporation in a rotary evaporator. A brownish powder is obtained, which is subsequently dried at 125° C. for 4 hours. 5 g of the so obtained powder is dissolved in 95 g of ethanol. The samples are immersed into the so obtained solution and are retracted from the solution at a rate of 20 cm/min to produce a layer of 100 nm thickness.

For a realistic simulation of the conditions occurring during the fabrication of a thin film storage element and over the service life thereof during the charging and discharging cycles, samples are provided with a metallic titanium layer or a layer containing titanium in the form of ions, and once prepared the samples are treated in a furnace process which comprises: heating the sample from room temperature to 550° C. at a heating rate of 5 K/min; holding time of 20 minutes at 550° C.; cooling in the furnace to room temperature.

Following the treatment in the furnace, diffusion of the metal into the samples is analyzed by Time-of-Flight Secondary Ion Mass Spectroscopy (ToF-SIMS). For this purpose, a small area (about 300×300 μm$^2$) of the sample is successively removed (sputtered) using an ion gun, interrupted by analysis cycles. The ions of the released elements detected in the analysis cycles are recorded as a function of sputtering time. In the simplest case, an intensity-sputtering time profile is obtained. Based on a comparison of the profiles of different samples it is possible to evaluate the diffusion of the titanium in different substrate materials.

The intensity-sputtering time profiles are evaluated as follows. First, the interface between layer and substrate material is identified by determining the sputtering time "$t_{IF}$" at which the Ti signal which is constant within the layer begins to degrade and at the same time the signals of the elements of which the sheet-type discrete element is made are increasing.

Then, the maximum penetration depth of the titanium is identified by determining the sputtering time "$t_{PD}$" at which the Ti signal has been degraded to a constant level.

Finally, the penetration depth of the titanium into the material is determined by calculating the difference "$t_{PD}-t_{IF}$".

The sheet-type element of the invention consists of at least one oxide or a mixture or compound of oxides.

In a further embodiment of the invention, this at least one oxide is SiO$_2$.

In a further embodiment of the invention, the sheet-type element is made of glass. Within the context of the present application, the term 'glass' refers to a material which is essentially inorganic in nature and predominantly consists of compounds of metals and/or semimetals with elements of groups VA, VIA, and VIIA of the periodic table of elements, but preferably with oxygen, and which is distinguished by an amorphous state, i.e. a three-dimensional state without periodical order, and by a specific electrical resistance of greater than $1.0*10^6$ Ohm·cm at a temperature of 350° C. and at an alternating current with a frequency of 50 Hz. Hence, in particular the amorphous material LiPON which is used as a solid-state ion conductor is not considered to be a glass in the sense of the present application.

According to a further embodiment of the invention, the sheet-type element of the invention is obtained through a melting process.

Preferably, the sheet-type element is formed into a sheet-type shape in a shaping process following the melting process. This shaping may be performed directly following the melting (known as hot forming). However, it is as well possible that first a solid, essentially non-shaped body is obtained which is transformed into a sheet-type state in a further step, by reheating and mechanical reshaping.

If the shaping of the sheet-type element is accomplished by a hot forming process, this will, according to one embodiment of the invention, involve drawing processes, for example down-draw, up-draw, or overflow fusion processes. However, other hot forming processes are also possible, for example shaping in a float process.

The sheet-type discrete element can be used in an electrical storage system, in particular as a substrate for depositing functional energy storage layers. It is also possible to use the sheet-type discrete element for covering a structure of functional layers of an electrical storage system, or as a superstrate.

In the context of the present invention, a sheet-type discrete element is referred to as a superstrate if it is not used as a substrate, that is to say as a support for applying further refinements or structures, but is rather employed as a superimposed element, for example a sealing or cover glass. Prior to being employed as a superstrate, for example as a cover glass, however, the superstrate itself may also have been subjected to separate processes during which it assumed the function of a substrate for these separate processes and may for instance carry structures or patterns such as optical coatings for selectively adjusting optical transmittance.

In the context of the present invention, the superstrate may be made of the same material as the substrate. This is advantageous, for example, if the substrate and the superstrate should preferably have the same coefficient of thermal expansion in order to avoid thermal stresses.

EXAMPLES

The following tables give some exemplary compositions of sheet-type elements according to the invention.

Exemplary Embodiment 1

The composition of the sheet-type discrete element is given, by way of example, by the following composition, in wt %:

$SiO_2$ 50 to 66
$B_2O_3$ 0 to 5.5
$Al_2O_3$ 13 to 35
MgO 0 to 7
CaO 5 to 14
SrO 0 to 8
BaO 6 to 18
$P_2O_5$ 0 to 2
$ZrO_2$ 0 to 3
$TiO_2$ 2 to 5
$CeO_2$ 0 to 5
$MoO_3$ 0 to 5
$Fe_2O_3$ 0 to 5
$WO_3$ 0 to 5
$Bi_2O_3$ 0 to 5.

Exemplary Embodiment 2

The composition of a further sheet-type discrete element according to the invention is given, by way of example, by the following composition, in wt %:

$SiO_2$ 30 to 85
$B_2O_3$ 3 to 20
$Al_2O_3$ 0 to 15
$Na_2O$ 3 to 15
$K_2O$ 3 to 15
ZnO 0 to 12
$TiO_2$ greater than or equal to 2 to 10
CaO 0 to 0.1.

For a better explanation of the invention, the following table 1 gives further specific Exemplary Embodiments (EE) for sheet-type discrete elements according to the invention, which were examined for their contact stability with respect to titanium. Also given are Comparative Examples (CE) of non-inventive sheet-type discrete elements with regard to their contact stability against metallic titanium and titanium ions.

The data on the composition of the examples listed here are given in percent by weight (wt %) in each case. Also given, as far as known, are the values for the coefficient of thermal expansion α in the range from 20 to 300° C. in ppm/K, the transformation temperature $T_g$ in ° C., and the density in g/cm³.

TABLE 1

| | CE1 | CE2 | EE3 | EE4 | CE3 | CE4 | EE5 |
|---|---|---|---|---|---|---|---|
| $SiO_2$ | 61.0 | 59.92 | 64.0 | 62.65 | 66.49 | 65.2 | 65.0 |
| $Al_2O3$ | 18.0 | 17.27 | 4.0 | 4.11 | 4.35 | 4.27 | 22.0 |
| $B_2O_3$ | 10.0 | 10.22 | 8.3 | 8.19 | 8.7 | 8.53 | |
| $TiO_2$ | | | 4.0 | 3.9 | | | 2.5 |
| $Li_2O$ | | 1.86 | | 1.87 | | 1.94 | 3.5 |
| $Na_2O$ | | | 6.5 | 6.3 | 6.68 | 6.55 | 0.5 |
| $K_2O$ | | | 5.5 | 6.72 | 7.13 | 6.99 | |
| MgO | 2.8 | 2.86 | | | | | 0.5 |
| CaO | 4.8 | 4.55 | | | | | |
| ZnO | | | 7.0 | 5.52 | 5.86 | 5.75 | 2.0 |
| SrO | | | | | | | |
| BaO | 3.3 | 3.12 | | | | | 2.0 |
| $CeO_2$ | | | | | | | |
| $ZrO_2$ | | | | | | | 2.0 |
| $Sb_2O_3$ | | | 0.6 | 0.74 | 0.78 | 0.77 | |
| $As_2O_3$ | | | | | | | |
| $SnO_2$ | 0.1 | 0.19 | | | | | |
| Cl | | | 0.1 | | | | |
| $P_2O_5$ | | | | | | | |
| Total | 100.0 | 99.99 | 100.0 | 100.0 | 99.99 | 100.0 | 100.0 |
| $α_{(20-300)}$ | 3.2 | | 7.2 | | | | |
| $T_g$ | 717 | | 557 | | | | |
| Density | 2.43 | | 2.5 | | | | |
| Titanium | | | | | | | |
| ToF-SIMS $TiO_2$ | 0 | + | | + | 0 | 0 | |
| ToF-SIMS | − | 0 | | + | − | 0 | |

− high penetration depth of the Ti into the glass, in arbitrary units
0 medium penetration depth of the Ti into the glass, in arbitrary units
+ low penetration depth of the Ti into the glass, in arbitrary units Based on the examinations it was found that the titanium diffusion into the sheet-type discrete element is reduced by the presence of $TiO_2$ in the sheet-type discrete element itself.

The same also applies when an exposure to titanium is not caused by the metal, but rather in the form of ions, for example from $TiO_2$.

For this reason, a sheet-type discrete element according to the invention contains at least 2 wt % of $TiO_2$, preferably at least 3 wt % of $TiO_2$.

BRIEF DESCRIPTION OF THE DRAWINGS

FIG. 1 shows a diagram illustrating the penetration depth of metallic and ionic titanium as a function of the $TiO_2$ content of the sheet-type discrete element;

FIG. 2 is a schematic view of an electrical storage element; and

DETAILED DESCRIPTION

Figure 3:
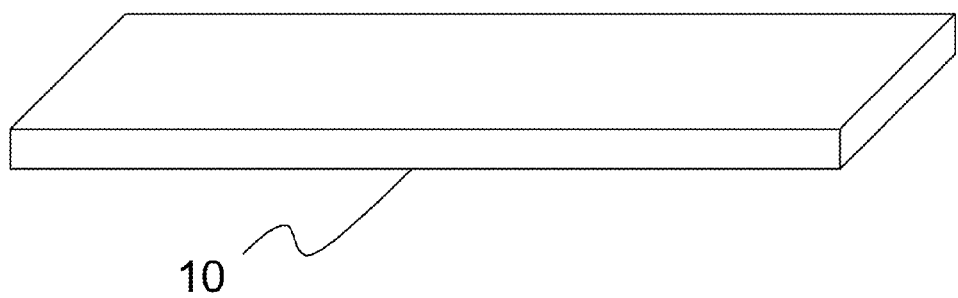
FIG. 3 is a schematic view of a sheet-type discrete element.

FIG. 1 shows a diagram for illustrating the influence of the $TiO_2$ content of the sheet-type discrete element on the diffusion of metallic titanium and ionic titanium. The penetration depth of titanium is shown in arbitrary units (arb.u.) in each case, at the left for metallic titanium, at the right for ionic titanium. The composition of the sheet-type discrete elements corresponds to Exemplary Embodiment 4 and to Comparative Example 3, respectively, of table 1. The two examples differ in that Comparative Example 3 does not contain $TiO_2$, in contrast to Exemplary Embodiment 4. With regard to titanium diffusion, the penetration depth in the titanium-containing sheet-type discrete element is significantly reduced, for both the case of metallic exposure and for the ionic exposure to $TiO_2$.

FIG. 2 schematically shows an electrical storage system 1 according to the present invention. It comprises a sheet-type discrete element 2 which is used as a substrate. A sequence of different layers is applied on the substrate. By way of example and without being limited to the present example, first the two collector layers are applied on the sheet-type discrete element 2, cathode collector layer 3, and anode collector layer 4. Such collector layers usually have a thickness of a few micrometers and are made of a metal, for example of copper, aluminum, or titanium. Superimposed on collector layer 3 is cathode layer 5. If the electrical storage system 1 is a lithium-based thin film battery, the cathode is made of a lithium-transition metal compound, preferably an oxide, for example of $LiCoO_2$, of $LiMnO_2$, or else of $LiFePO_4$. Furthermore, the electrolyte 6 is applied on the substrate and is at least partially overlapping cathode layer 5. In the case of a lithium-based thin film battery, this electrolyte is mostly LiPON, a compound of lithium with oxygen, phosphorus, and nitrogen. Furthermore, the electrical storage system 1 comprises an anode 7 which may for instance be made of lithium titanium oxide or else of metallic lithium. Anode layer 7 is at least partially overlapping electrolyte layer 6 and collector layer 4. Furthermore, the battery 1 comprises an encapsulation layer 8.

In the context of the present invention, any material which is capable of preventing or greatly reducing the attack of fluids or other corrosive materials on the electrical storage system 1 is considered as an encapsulation or sealing of the electrical storage system 1.

FIG. 3 schematically illustrates a sheet-type discrete element according to the present invention, here in the form of a sheet-type shaped body 10. In the context of the present invention, a shaped body is referred to as being of sheet type or a sheet if its dimension in one spatial direction is not more than half of that in the two other spatial directions. A shaped body is referred to as a ribbon in the present invention, if it has a length, width, and thickness for which the following relationship applies: the length is at least ten times larger than the width which in turn is at least twice as large as the thickness.

LIST OF REFERENCE NUMERALS

1 Electrical storage system
2 Sheet-type discrete element used as a substrate
3 Cathode collector layer
4 Anode collector layer
5 Cathode
6 Electrolyte
7 Anode
8 Encapsulation layer
10 Sheet-type discrete element in the form of a sheet-type shaped body

What is claimed is:

1. A sheet-type discrete element comprising a composition, in wt %, of:
   $SiO_2$ 30 to 85,
   $B_2O_3$ 3 to 20,
   $Al_2O_3$ 0 to 15,
   $Na_2O$ 3 to 15,
   $K_2O$ 3 to 15,
   $ZnO$ 0 to 12,
   $TiO_2$ greater than or equal to 2 to 10, and
   $CaO$ 0 to 0.1; and
   at least one surface that is inert and/or permeable to a reduced degree and/or impermeable with respect to materials coming into contact with the at least one surface.

2. The sheet-type discrete element as claimed in claim 1, further comprising a thickness variation of not more than 25 μm based on wafer or substrate sizes in a range of >100 mm in diameter.

3. The sheet-type discrete element as claimed in claim 1, further comprising a thickness of less than 2 mm.

4. The sheet-type discrete element as claimed in claim 1, further comprising a thickness of not more than 100 μm.

5. The sheet-type discrete element as claimed in claim 1, further comprising a water vapor transmission rate (WVTR) of $<10^{-3}$ g/(m²·d).

6. The sheet-type discrete element as claimed in claim 1, further comprising a specific electrical resistance at a temperature of 350° C. and at alternating current with a frequency of 50 Hz of greater than $1.0*10^6$ Ohm·cm.

7. The sheet-type discrete element as claimed in claim 1, further comprising a maximum load temperature $\theta_{Max}$ of at least 400° C.

8. The sheet-type discrete element as claimed in claim 1, further comprising a coefficient of linear thermal expansion α in a range from $2.0*10^{-6}$/K to $10*10^{-6}$/K.

9. The sheet-type discrete element as claimed in claim 1, further comprising a coefficient of linear thermal expansion α in a range from $3.0*10^{-6}$/K to $8.0*10^{-6}$/K.

10. The sheet-type discrete element as claimed in claim 1, comprising a product of maximum load temperature ($\theta_{Max}$) and a coefficient of linear thermal expansion (α) of $600 \cdot 10^{-6} \leq \theta_{Max} \cdot \alpha \leq 8000 \cdot 10^{-6}$.

11. The sheet-type discrete element as claimed in claim 1, comprising a product of maximum load temperature ($\theta_{Max}$) and a coefficient of linear thermal expansion (α) of $800 \cdot 10^{-6} \leq \theta_{Max} \cdot \alpha \leq 5000 \cdot 10^{-6}$.

12. The sheet-type discrete element as claimed in claim 1, wherein the at least one surface is designed as a barrier layer.

13. The sheet-type discrete element as claimed in claim 12, wherein the barrier layer is a barrier against a diffusion of metals.

14. The sheet-type discrete element as claimed in claim 12, wherein the barrier layer is a barrier against a diffusion of transition metals.

15. The sheet-type discrete element as claimed in claim 12, wherein the barrier layer is formed by doping or overdoping with at least one alkali metal and/or transition metals.

16. The sheet-type discrete element as claimed in claim 1, wherein the composition is a glass.

17. A sheet-type discrete element comprising a composition, in wt %, of:
$SiO_2$ 30 to 85,
$B_2O_2$ 3 to 20,
$Al_2O_3$ 0 to 15,
$Na_2O_3$ 0 to 15,
$K_2O$ 3 to 15,
ZnO 0 to 12,
$TiO_2$ greater than or equal to 2 to 10, and
CaO 0 to 0.1, wherein the sheet-type discrete element is configured for a use elected from the group consisting of a substrate in an electrical storage system, a superstrate in an electrical storage system, and a cover in an electrical storage system.

18. An electrical storage system, comprising:
at least one sheet-type discrete element having a thickness of less than 2 mm and a composition, in wt %, of:
$SiO_2$ 30 to 85,
$B_2O_3$ 3 to 20,
$Al_2O_3$ 0 to 15,
$Na_2O$ 3 to 15,
$K_2O$ 3 to 15,
ZnO 0 to 12,
$TiO_2$ greater than or equal to 2 to 10, and
CaO 0 to 0.1,
wherein the at least one sheet-type discrete element exhibits high resistance against an attack of transition metals or transition metal ions, and
wherein the titanium transition metals or transition metal ions comprise titanium or titanium ions.

19. An electrical storage system, comprising:
at least one sheet-type discrete element having a thickness of less than 2 mm and a composition, in wt %, of:
$SiO_2$ 30 to 85,
$B_2O_3$ 3 to 20,
$Al_2O_3$ 0 to 15,
$Na_2O$ 3 to 15,
$K_2O$ 3 to 15,
ZnO 0 to 12,
$TiO_2$ greater than or equal to 2 to 10, and
CaO 0 to 0.1,
wherein the at least one sheet-type discrete element exhibits high resistance against an attack of transition metals or transition metal ions; and
at least one surface of the at least one sheet-type discrete element is inert and/or permeable to a reduced degree and/or impermeable to materials coming into contact with the at least one surface.

20. The electrical storage system as claimed in claim 19, wherein the at least one surface is a barrier layer.

21. The electrical storage system as claimed in claim 20, wherein the barrier layer is a barrier against a diffusion of metals.

22. The electrical storage system as claimed in claim 20, wherein the barrier layer is a barrier against a diffusion of transition metals.

23. The electrical storage system as claimed in claim 20, wherein the barrier layer is formed by doping or overdoping with at least one alkali metal and/or a transition metal.

24. The electrical storage system as claimed in claim 20, wherein the barrier layer is a barrier against a diffusion of titanium and/or titanium ions.

* * * * *